United States Patent [19] [11] 3,956,419
Murray [45] May 11, 1976

[54] ORGANIC REINFORCING FILLERS FOR SILICONE RUBBER

[75] Inventor: James G. Murray, East Brunswick, N.J.

[73] Assignee: Mobil Oil Corporation, New York, N.Y.

[22] Filed: Dec. 5, 1973

[21] Appl. No.: 422,123

[52] U.S. Cl. .................. 260/827; 260/33.6 UA; 260/876 B; 260/880 B; 260/880 R; 260/886; 526/82; 526/84; 526/336; 526/340
[51] Int. Cl.$^2$ ................ C08F 212/08; C08F 2/14; C08F 212/36
[58] Field of Search ....... 260/827, 33.6 UA, 88.2 C, 260/876 B, 880 B, 878 B, 886

[56] References Cited
UNITED STATES PATENTS

| | | | |
|---|---|---|---|
| 3,135,716 | 6/1964 | Uraneck et al. | 260/880 B |
| 3,231,635 | 1/1966 | Holden et al. | 260/880 B |
| 3,684,761 | 8/1972 | Stampa | 260/33.6 UA |
| 3,692,874 | 9/1972 | Farrar et al. | 260/880 B |
| 3,728,300 | 4/1973 | Minekawa et al. | 260/876 B |
| 3,734,978 | 5/1973 | Schwab | 260/878 B |
| 3,751,403 | 8/1973 | Hara et al. | 260/88.2 C |

*Primary Examiner*—Wilbert J. Briggs, Sr.
*Attorney, Agent, or Firm*—Charles A. Huggett; Hastings S. Trigg

[57] ABSTRACT

Organic reinforcing fillers for silicone rubber are prepared by the anionic initiated slurry polymerization of styrene and divinylbenzene in the presence of a block polymer dispersant, using, as the anionic initiator, an alkali metal-bearing compound and terminating the polymerization by reaction of the polymer particles with a terminating agent that provides in the polymer groups reactive with silicones rubber in a normal rubber cure.

10 Claims, No Drawings

ORGANIC REINFORCING FILLERS FOR SILICONE RUBBER

BACKGROUND OF THE INVENTION

1. Field of the Invention

This invention is concerned with organic reinforcing fillers for silicone rubbers and their preparation.

2. Description of the Prior Art

Various materials have been proposed and used as reinforcing fillers for silicone rubber. Treated fine particle silicas are the major reinforcing fillers in use.

SUMMARY OF THE INVENTION

Organic reinforcing fillers for silicone rubber are prepared by anionic initiated slurry polymerization of styrene and divinylbenzene in the presence of a block polymer dispersant that controls the particles of the resulting crosslinked polymer to a fine size, desirably less than 2000 A, and under conditions of anionic initiator and reactant usage to impart, into the polymer, groups that are reactive with silicone rubber in a normal rubber cure to provide effective bonding of the polymer particles to the silicone rubber.

The block polymer dispersant useful for practice of this invention is comprised of polystyrene blocks and hydrocarbon-soluble blocks and non-reactive with the anionic initiator. Particularly suitable are AB and ABA block polymers in which segment A is derived from styrene in amount of about 5 to 80 weight percent, and preferably about 5 to about 50 based upon the total block polymer.

The slurry polymerization is carried out by use, as the anionic initiator, of an alkali metal compound that initiates polymerization of styrene and divinylbenzene and does not impart, to the resulting polymer particles, groups substantially reactive with silicone rubber in a normal rubber cure, in which the slurry polymerization is terminated by reaction of the polymer particles with a suitable terminating agent that imparts groups reactive with silicone rubber in a rubber cure operation.

DESCRIPTION OF SPECIFIC EMBODIMENTS

The organic reinforcing fillers embodied herein are prepared by slurry polymerization of styrene and divinylbenzene utilizing, as an anionic initiator, an alkali metal-bearing compound capable of initiating the polymerization of styrene, in the presence of an AB or ABA block polymer dispersant, and terminating the polymerization with reactants that impart, to the resulting polymer particle, groups that react with silicone rubber in a normal rubber cure operation.

In the slurry polymerization process embodied herein, the divinylbenzene (o-, p-, or mixed isomers) serves as a crosslinking agent and is generally used in an amount of between about 0.5 and 15.0 weight percent based on the styrene reactant.

The anionic initiator useful for the practice of this invention is a non-polymeric alkali metal-bearing initiator typified by alkali metal alkyls including, in exemplification, butyllithium, secbutyl lithium, amyl lithium, ethyl lithium, etc. as well as their corresponding sodium compounds; lithium or sodium salts of materials, such as alpha methyl styrene 1,1-diphenylethylene, naphthalene and others. Such materials, when used as the sole anionic initiators, result in a crosslinked "living" polymer from the slurry polymerization embodied herein, whereby the slurry polymerization is terminated by further reaction with a suitable terminating agent to provide groups reactive with silicone rubber in a rubber cure operation.

The amount of anionic catalyst or initiator that is used is generally in the range of $10^{-1}$ to $10^{-4}$ moles per 100 grams of styrene reactant.

The slurrying medium for the polymerization reaction is an aliphatic hydrocarbon, liquid at the conditions of operation of the slurry polymerization, that is not reactive with the anionic initiator. The aliphatic hydrocarbon can be normal or branched chain, paraffinic or monoolefinic of at least three carbon atoms and, more desirably, of four to seven carbon atoms content. Typical slurrying media include butane, pentane, isopentane, hexane, heptane, 2,2-dimethylbutane, butene, pentene, as well as mixtures such as petroleum ether, pentane-pentene, hexane-hexene.

The polymerization process of the invention is carried out at temperatures between about 20°C. and about 120°C. The desired polymerization temperature is determined in part by the reflux temperature of the slurrying medium. It is, however, within the contemplation of this invention to use pressure in order to elevate the reflux temperature of the slurrying medium.

The block polymer dispersing agent, generally used in an amount of about 0.1 to about 10 weight percent of the styrene reactant, used to prepare the fine particle filler materials is preferably an AB or ABA block polymer. In the block polymer segment A is preferably derived from styrene in amounts from 5 – 80 weight percent styrene based on total block polymer. Segment B is based on monomers which polymerize to form a polymer readily soluble in aliphatic hydrocarbons and which does not readily react with the styryl anion. Suitable monomers for the formation of the B segment of the block polymer include an alkyl styrene such as t-butylstyrene, butadiene, isoprene, 2,2-dimethylbutadiene and the like and copolymers of the above dienes with styrene or alkyl styrenes.

The following Examples illustrate preparation of block polymers useful in practice of this invention.

EXAMPLE 1

In a reaction vessel equipped with a reflux condenser and agitation means were added 21 ml. of t-butylstyrene and 375 ml. of benzene. The solution was degassed by the application of a vacuum, followed by replacement with nitrogen. This step was repeated several times to insure proper degassing. A slight stream of nitrogen was continued throughout the ensuing polymerization reaction. A quantity of 1.9 ml. of 0.5 M secbutyl lithium was added to initiate the reaction and the temperature was raised to 75°C. The polymerization was continued for 45 minutes. At this time 64 ml. of purified styrene monomer was added to the reactor and polymerization was allowed to proceed for an additional 30 minutes. The block polymer was separated from solution by precipitation in methanol. The reaction produced 74 grams of a block polymer containing 75 percent styrene by weight. Molecular weight data for this block polymer are set forth in Table I.

EXAMPLES 2 – 6

Using the procedure of Example 1, other t-butylstyrene-styrene block polymers were prepared and molecular weight data were obtained. Pertinent data are set forth in Table I.

TABLE I

| Example | % t-butylstyrene | % styrene | Ms × 10⁻³ (gms/mole) |
|---|---|---|---|
| 1 | 25 | 75 | 80 |
| 2 | 90 | 10 | 98 |
| 3 | 85 | 15 | 98 |
| 4 | 80 | 20 | 98 |
| 5 | 75 | 25 | 80 |
| 6 | 50 | 50 | 80 |

The following examples illustrate the preparation of dispersants other than of styrene and t-butyl-styrene:

EXAMPLE 7

An AB styrene-butadiene block copolymer was prepared by adding 0.9 ml. of 1.18 N sec-butyl lithium to a mixture of 20 g. of styrene in 350 ml. of benzene and 5 ml. of tetrahydrofuran under anhydrous air free conditions. After polymerization for one hour and twenty minutes at room temperature, 30 g. butadiene was distilled into the flask from over triethyl aluminum. After 2.5 hours additional reaction at room temperature, the reaction was terminated by addition of methanol and the product isolated by precipitation into a large volume of methanol. After filtration and drying there are isolated 48.7 g. of a polystyrene-butadiene block copolymer having blocks of polystyrene of 20,000 molecular weight and polybutadiene of 30,000 molecular weight.

EXAMPLE 8

An AB block polymer of styrene-isoprene was prepared by adding 0.42 ml. of 1.18 N sec-butyl lithium to a mixture of 10 g. of styrene of 175 ml. of benzene and 5 ml. of tetrahydrofuran at room temperature. The mixture was allowed to polymerize for 2 hours and 40 g. of dry air-free isoprene was added and the polymerization continued for 2 additional hours. The product was isolated by precipitation into methanol, yielding 27.5 g. of block polymer dispersant.

In regard to materials useful as terminating agents that impart groups in the polymer particles that are reactive with silicone rubber in a rubber cure operation, such materials are compounds that react with the styryl anion on the filler particles to form functional groups attached to the particles and which in turn will react with a silicone rubber molecule during conventional cure. Suitable terminating agents for that purpose include oxygen (air) to form hydroperoxide groups, cyclotrisiloxanes, vinyl and allyl silanes, and peroxy esters. Suitable compounds for terminating agents include: hexamethylcyclotrisiloxane; vinyldimethylchlorosilane; allyldimethylchlorosilane; vinylmethyldichlorosilane; allylmethyldichlorosilane; air followed by acetyl chloride forming a peracetate ester; air followed by benzoyl chloride forming a perbenzoate ester; and air followed by acetic acid forming a hydroperoxide.

EXAMPLE 9

A crosslinked styrene-divinylbenzene fine particle product was prepared by polymerization of 30 g. styrene and 3 g. 55% divinylbenzene in 500 ml. hexane using 2.89 ml. of 2N S-butyllithium as catalyst and 1.5 g. of styrene-t-butylstyrene block copolymer of Example 4 as dispersant (20,000 – 80,000 M.W. blocks respectively) under nitrogen. At the end of 1 hour reaction at reflux the solution was treated with 3.0 ml. of dry, air free t-butylstyrene for 30 minutes followed by 2.0 g. of hexamethylcyclotrisiloxane in 5.0 ml. of tetrahydrofuran for 2.5 hours. This was followed by the addition of 1.26 ml. of allyldimethylchlorosilane. The resulting product was blended with 118 g. of dimethyl siloxane rubber (General Electric Co. No. SE-76) dissolved in hexane and the mixture precipitated into methanol to give a product containing 28 parts of filler particles per 100 parts of silicone rubber. This product was mixed with 2 parts of dicumylperoxide per 100 parts of silicone rubber and cured in a press at 135°C. for 35 minutes. The cured rubber had the following properties:

Tensile:
Elongation to Break — 696%
Break Strength — 344 psi.
Shore A hardness — 48
Modulus at 300% elongation — 152 psi.

EXAMPLE 10

A styrene-divinylbenzene fine particle product was prepared by polymerization of 30 g. of styrene and 3 g. of 55% divinylbenzene in 250 ml. of hexane using 4.83 ml. of 1.18 N S-butyllithium as catalyst and 1.5 g. of the styrene-isoprene block copolymer dispersant of Example 4 under nitrogen. After 1.5 hours reflux the mixture was cooled to 20°C. and reacted with air followed by 0.36 ml. of acetic acid to convert the terminal lithium groups to hydroperoxide groups. The resulting mixture was then mixed with a solution of dimethyl silicone rubber dissolved in hexane (Gen. Elec. SE-76) and the mixture precipitated into methanol to give a masterbatch product containing 50 parts of filler per 100 parts of silicone rubber.

This masterbatch mixture was then blended with additional dimethyl silicone rubber and cured as indicated in the following table to give cured samples of silicone rubber.

| Filler Parts* | Peroxide Parts** | Cure Time Min. | psi. Break | Tensile % Elongation | psi. at 300% Stress |
|---|---|---|---|---|---|
| 28 | 1.28 | 45 | 460 | 513 | 270 |
| 28 | 2.0 | 75 | 412 | 359 | 342 |
| 40 | 1.28 | 35 | 451 | 442 | 335 |

*Per 100 parts silicone rubber
**Dicumyl Peroxide cured at 150°C.

From the foregoing data, it will be appreciated that the organic reinforcing fillers of this invention are highly effective when blended with a silicone rubber base stock and the usual rubber curing components and then cured. The terminal reactive groups help to promote the rubber cure and bond to the silicone rubber molecule during the cure reaction.

The compositions of this invention include mixtures of the reinforcing fillers with a curable silicone rubber, such as dimethyl siloxane gum rubber and its copolymers with phenyl methyl siloxane; methyl phenyl siloxanes; methyl vinylsiloxanes; methyl hydrogen siloxanes; and diphenyl siloxanes. The amount of reinforcing filler used will generally be about 10 to about 100 parts (by weight) per 100 parts (by weight) of silicone rubber, i.e., PHR.

A discussion of compounding and vulcanizing silicone rubbers can be found on pages 388–398 of "Introduction to Rubber Technology" edited by Maurice Morton, Reinhold Publishing Corporation, New York (1959), to which reference is made.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for producing an organic reinforcing filler for rubber that comprises slurry polymerizing a reaction mixture comprising styrene, divinylbenzene in an amount of 0.5–15 weight per cent based on styrene, and an anionic polymerization initiator dispersed in a liquid aliphatic hydrocarbon slurrying medium in presence of from about 0.1 to about 10 weight percent based upon the styrene reactant of an AB or ABA block polymer dispersing agent, in which segment A is derived from styrene in an amount of 5–80 weight percent styrene based on total block polymer and segment B is derived from t-butylstyrene, butadiene, isoprene, or 2, 2-dimethylbutadiene, to produce a finely divided solid cross-linked polymer, said anionic polymerization initiator comprising an alkali metal-bearing compound capable of initiating polymerization of styrene but without imparting, to the resulting finely divided polymer, groups substantially reactive with silicone rubber in rubber cure, and terminating the slurry polymerization in the presence of a terminating agent reactive with the cross-linked polymer to impart thereto groups reactive with silicone rubber in a rubber cure operation; said terminating agent being hexamethylcyclotrisiloxane, vinyldimethylchlorosilane, allyldimethylchlorosilane, vinylmethyldichlorosilane, allylmethyldichlorosilane, air followed by acetyl chloride forming a peracetate ester, air followed by benzoyl chloride forming a perbenzoate ester, or air followed by acetic acid forming a hydroperoxide.

2. A process, as defined in claim 1, carried out with an initiator which is an alkali metal salt of a monomeric hydrocarbon compound.

3. A process, as defined in claim 2, wherein the initiator is an alkyl lithium.

4. A process, as defined in claim 3, wherein the initiator is a butyllithium.

5. A process, as defined in claim 1, carried out in presence of a liquid aliphatic hydrocarbon of four to seven carbon atom content as the slurrying medium and an AB or ABA block polymer dispersant in which segment A is comprised of polystyrene blocks and B of hydrocarbon soluble blocks, with A in amount of about 5 to about 80 weight per cent of the total block polymer.

6. A process, as defined in claim 5, wherein the block polymer dispersant is a block polymer of styrene and t-butylstyrene, styrene and butadiene, or styrene and isoprene.

7. A process, as defined in claim 1, wherein the terminating agent is hexamethylcyclotrisiloxane and allyldimethylchlorosilane.

8. A process, as defined in claim 1, wherein the terminating agent is air followed by acetic acid.

9. The reinforcing filler produced by the process of claim 7.

10. The reinforcing filler produced by the process of claim 8.

* * * * *